United States Patent [19]
Chang

[11] Patent Number: 5,816,623
[45] Date of Patent: Oct. 6, 1998

[54] SELF-LOCKING QUICK DISCONNECT COUPLING DEVICE

[76] Inventor: King Chang, No. 20, Hsi Wei St., San Chung City, Taipei Hsien, Taiwan

[21] Appl. No.: 713,506

[22] Filed: Sep. 13, 1996

Related U.S. Application Data

[63] Continuation-in-part of Ser. No. 501,499, Jul. 12, 1995, abandoned.
[51] Int. Cl.[6] .............................. F16L 37/20; F16L 55/00
[52] U.S. Cl. ........................... 285/88; 285/309; 285/312; 285/81
[58] Field of Search ................................. 285/81, 87, 88, 285/309, 310, 311, 312

[56] References Cited

U.S. PATENT DOCUMENTS

| | | | |
|---|---|---|---|
| 1,903,445 | 4/1933 | Ernst | 285/88 |
| 4,802,694 | 2/1989 | Vargo | 285/87 |
| 5,005,876 | 4/1991 | Fahl | 285/311 |
| 5,295,717 | 3/1994 | Chen | 285/312 X |

*Primary Examiner*—Terry Lee Melius
*Assistant Examiner*—Heather Shackelford
*Attorney, Agent, or Firm*—Oppenheimer Poms Smith

[57] ABSTRACT

A self-locking quick-disconnect coupling device includes a female coupler including a stop formed thereon and an opening defined therethrough. A male adaptor through which a recess is defined is insertable into the female coupler. A cam handle includes a handle portion and a cam portion rotatably mounted on the coupler between a releasing and an engaging position so that the cam portion is moved through the hole into the recess. A hooking element is pivotably linked to the handle portion. The hooking element includes a barb projecting therefrom and including an inclined surface. A locking control element including first and second distal ends is pivotably linked to the handle portion. The inclined surface will slide on the stop when the cam portion is pivoted from the releasing position to the engaging position thus allowing the barb to snap into engagement with the stop when the cam handle is in the engaging position.

11 Claims, 7 Drawing Sheets

5,816,623
SELF-LOCKING QUICK DISCONNECT COUPLING DEVICE

RELATED APPLICATIONS

This application is a Continuation-in-Part application of U.S. application Ser. No. 08/501,499 filed on Jul. 12, 1995, now abandoned.

BACKGROUND OF THE INVENTION

This invention relates to a self-locking quick-disconnect coupling device for connection between two pipes or hoses used for transmission of gasoline or other chemical liquid.

A typical locking quick-disconnect coupling device includes a female coupler with two lugs projecting from the coupler. An aperture is defined in each of the lugs. A hole is defined in the coupler between the lugs. A cam handle includes a cam portion and a handle portion projecting from the cam portion. The cam handle is linked to the lugs. A pipe or hose be installed into a male adapter with grooved end can be inserted into the female coupler so that the grooved end is aligned with the hole. The handle portion can be pivoted in order to locate the cam portion in the grooved end. A locking pin can be inserted into the apertures in order to prevent pivoting of the cam handle so as to ensure firm connection between the female coupler and the male adapter of pipe or hose. However, if a worker forgets or is too lazy to insert the locking pin into the apertures, the connection between male adaptor of the pipe or hose and the female coupler will not be fully secured thus exposing people and environment to unnecessary risk caused by leakage of chemical liquid transmitted by means of the pipe or hose.

SUMMARY OF THE INVENTION

It is the primary objective of this invention to provide a self-locking device on quick-disconnect coupling device which involves a simple and secure operation.

The self-locking quick-disconnect coupling device includes a female coupler with a stop formed thereon and an opening defined therethrough. A male adaptor in which a recess is defined is insertable into the female coupler. A cam handle includes a handle portion and a cam portion rotatably mounted on the coupler between a releasing and an engaging position so that the cam portion is moved through the opening into the recess. A hooking element is pivotably linked to the handle portion. The hooking element includes a barb with an inclined surface. A locking control element including first and second distal ends is pivotably linked to the handle portion. The inclined surface will slide on the stop when the cam portion is pivoted from the releasing position to the engaging position thus allowing the barb to snap into engagement with the stop.

BRIEF DESCRIPTION OF THE DRAWINGS

This invention will be described in relation to the preferred embodiment shown in the drawings wherein.

DETAILED DESCRIPTION OF THE PREFERRED EMBODIMENT

Figure 1:
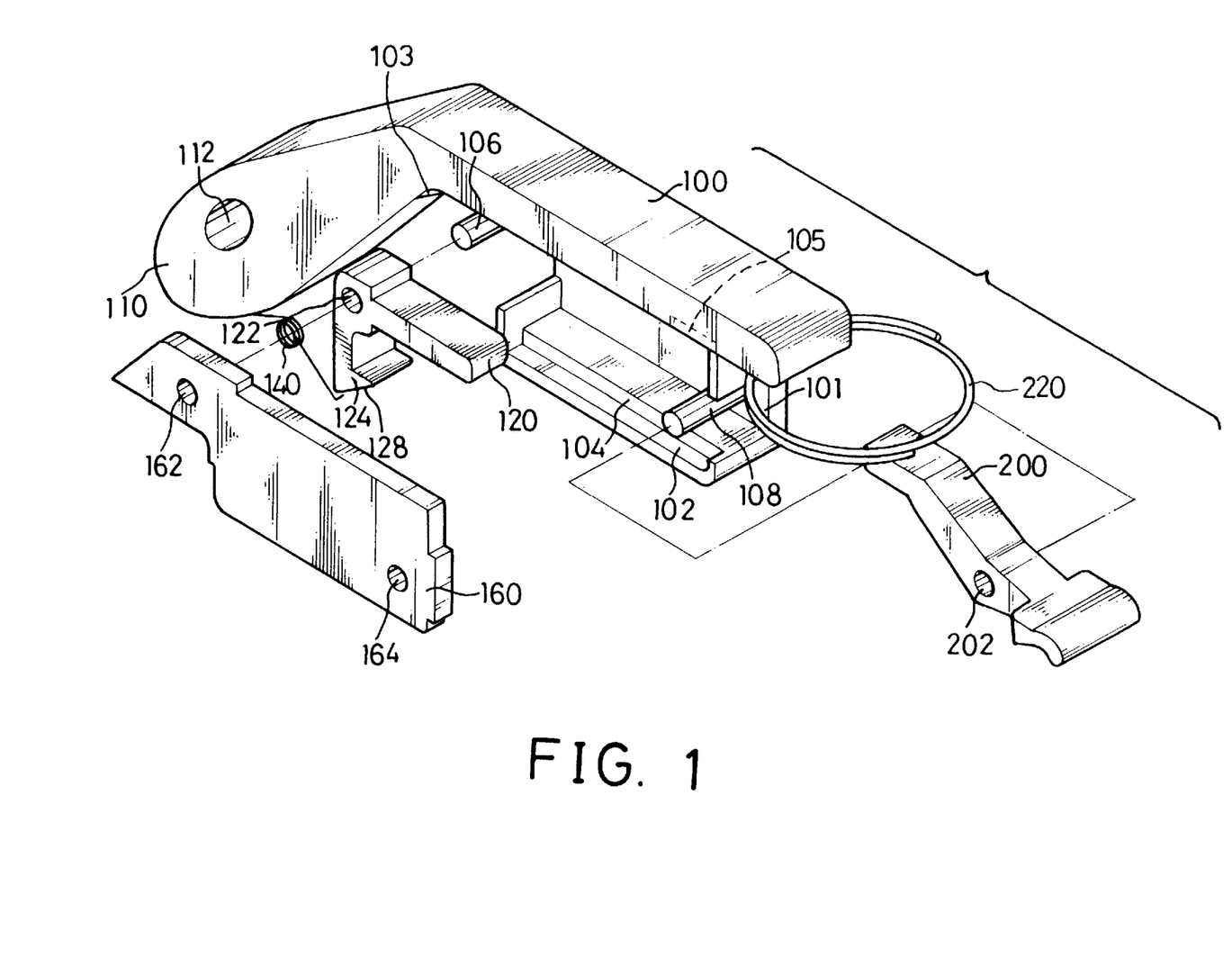
FIG. 1 is an exploded view of a first embodiment of a self-locking quick-disconnect coupling device according to this invention.

Referring to FIG. 1, a first embodiment of a self-locking quick-disconnect coupling device according to this invention includes a cam handle 100 consisting of a handle portion and a cam portion 110. A hole 112 is defined through the cam portion 110.

Figure 2:
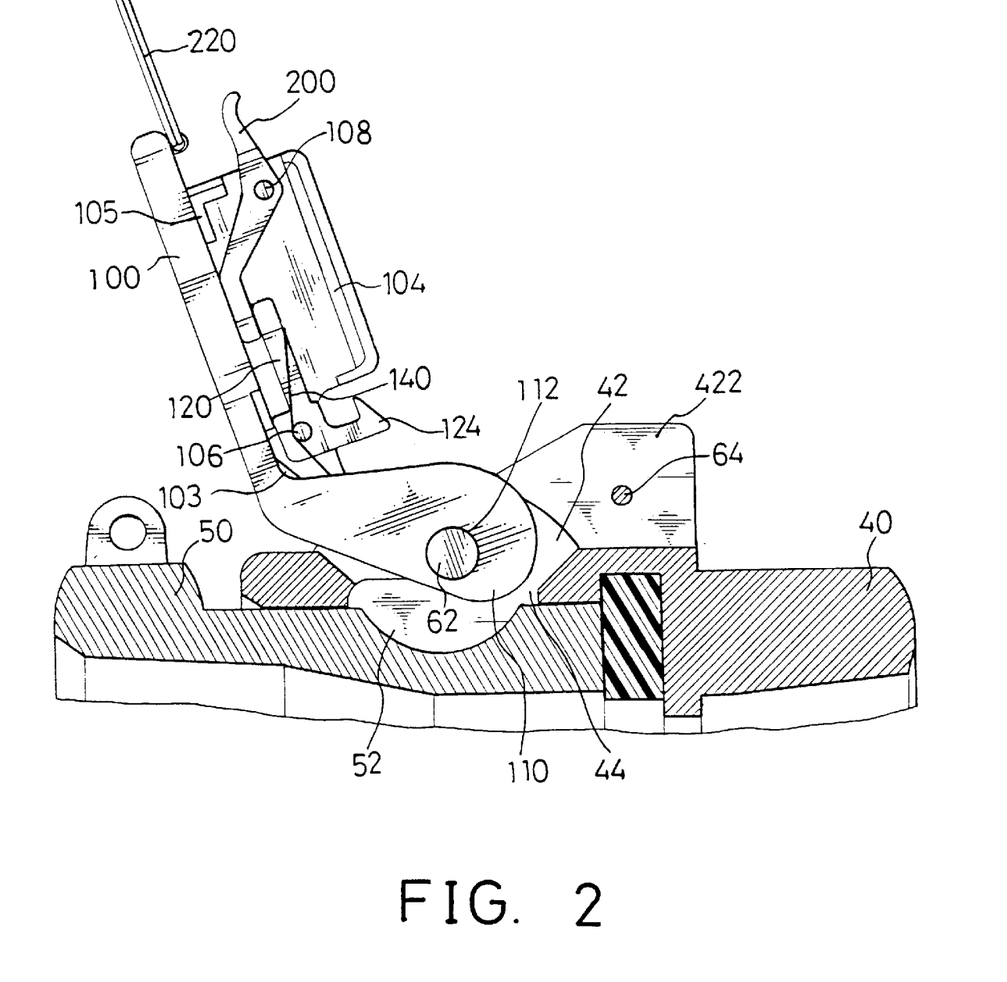
FIG. 2 is a side view of a partly cut-away coupler and the self-locking quick-disconnect coupling device shown in FIG. 1.

Referring to FIG. 2, a female coupler 40 includes two lugs 42 projecting from an external surface thereof. Two fins 422 are integrally formed with the lugs 42. First holes are defined through each of the lugs 42. Second holes are defined through each of the fins 422. An opening 44 is defined through the female coupler 40 between the two lugs 42.

The cam handle 100 is pivotably linked to the lugs 42 by insertion of a pivot 62 in the first hole defined through each of the lugs 42 and the hole 112 defined through the cam portion 110.

A recess 52 is defined in a male adaptor 50 which is inserted into the female coupler 40 so that the recess 52 is in communication with the opening 44. The cam handle 100 is pivotable in order to move the cam portion 110 through the opening 44 into the recess 52. Thus, the female coupler 40 and male adaptor 50 are locked together.

Referring to FIG. 1, a plate 101 projects integrally and vertically downward from the handle portion of the cam handle 100. A plate 102 projects horizontally from the plate 101. A shoulder 104 is formed on the plate 102. Two rods 106 and 108 project horizontally from the plate 101. Two shoulders 103 and 105 are formed respectively on two corners between the cam handle 100 and the plate 101.

A hooking element 120 includes first and second portions extending perpendicular to each other. A hole 122 is defined through the hooking element 120. An inclined surface 128 is formed on a barb 124 projecting from the first portion of the hooking element 120. The rod 106 is insertable into the hole 122 so that the hooking element 120 is pivotably mounted on the rod 106.

The second portion of the hooking element 120 is biased towards the handle portion of the cam handle 100 by means of a spring 140 mounted on the rod 106 or 108. In the illustrated embodiment, the spring 140 is a torque spring.

A locking control element 200 includes first and second distal ends and a hole 202 defined therethrough. The locking control element 200 is pivotably mounted on the rod 108 by means of insertion of the rod 108 into the hole 202. The second portion of the hooking element 120 is engageable with the first distal end of the locking control element 200.

A ring 220 is attached to a distal end of the handle portion of the cam handle 100 for the purposes of convenient handling of the self-locking quick-disconnect coupling device.

A plate 160 includes a hole 162 defined therethrough near a distal end thereof and a hole 164 defined therethrough near another distal end thereof. The rod 106 is inserted into the hole 162 and the rod 108 into the hole 164 thus mounting the plate 160 on the rods 106 and 108. The free end of each of the rods 106 and 108 is peened over so that the plate 160 is retained on the rods 106 and 108 by means of the hammered free ends of the rods 106 and 108 and the shoulders 104, 103 and 105. Thus, the hooking element 120, the spring 140 and the locking control element 200 are retained in position and protected by means of the plate 160.

In FIGS. 2–6, the plate 160 is omitted in order to show the hooking element 120, the spring 140 and the locking control element 200.

Referring to FIG. 2, the first distal end of the locking control element 200 is moved against the cam handle 100 by means of the second portion of the looking element 120 biased by means of the spring 140.

Figure 3:
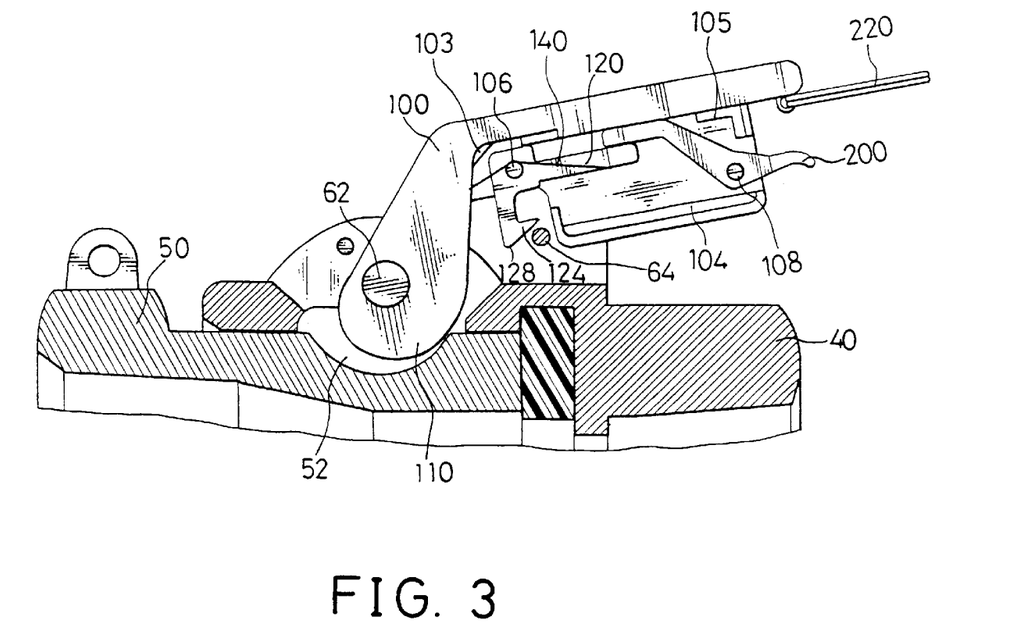
FIG. 3 is a side view similar to FIG. 2 but showing another position of the self-locking quick-disconnect coupling device.

The cam handle 100 can be pivoted to a position as shown in FIG. 3 so that the inclined surface 128 of the barb 124 is about to contact a rod 64 inserted through the second holes defined in the fins 422. As the cam handle 100 is further pivoted, the inclined surface 128 slides on the rod 64 thus compressing the spring 140. As the inclined surface 128 passes the rod 64, the barb 124 snappingly engages with the rod 64 due to the spring 140 (see FIG. 4).

Figure 4:
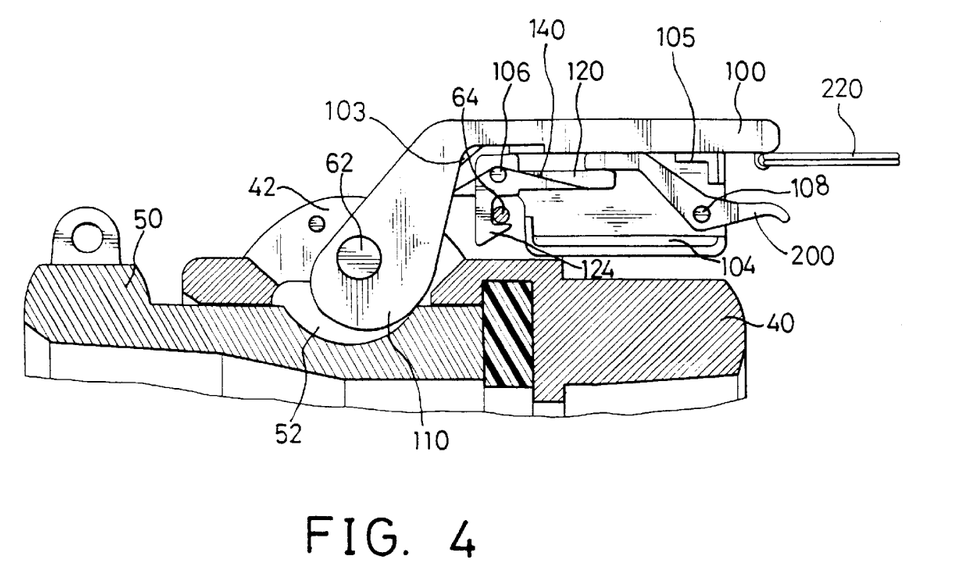
FIG. 4 is a side view similar to FIG. 3 but showing another position of the self-locking quick-disconnect coupling device.

To pivot the cam handle 100 from the female coupler 40, the barb 124 will be brought to engagement with the rod 64, tending to pivot the second portion of the hooking element 120. The second portion of the hooking element 120 is engaged with the first distal end of the locking control element 200 restrained by means of the cam handle 100. Thus, the cam handle 100 cannot be pivoted.

Figure 5:
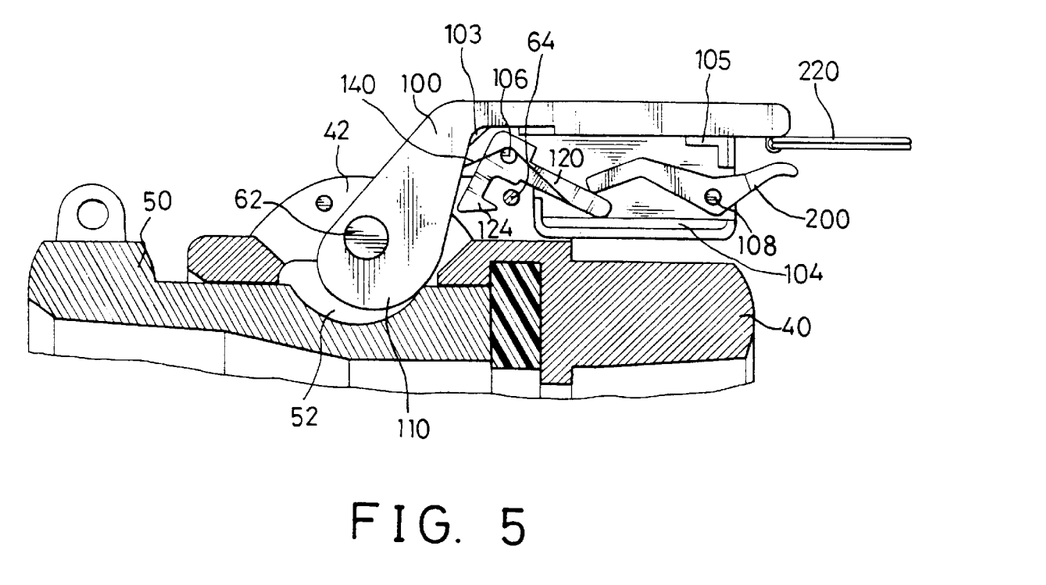
FIG. 5 is a side view similar to FIG. 4 but showing another position of the self-locking quick-disconnect coupling device.

Referring to FIG. 5, the barb 124 is disengaged from the rod 64 as the hooking element 120 is pivoted by means of the locking control element 200 pivoted by pushing the second distal end of the locking control element 200 upwardly. Thus, the cam handle 100 can be pivoted.

Figure 6:
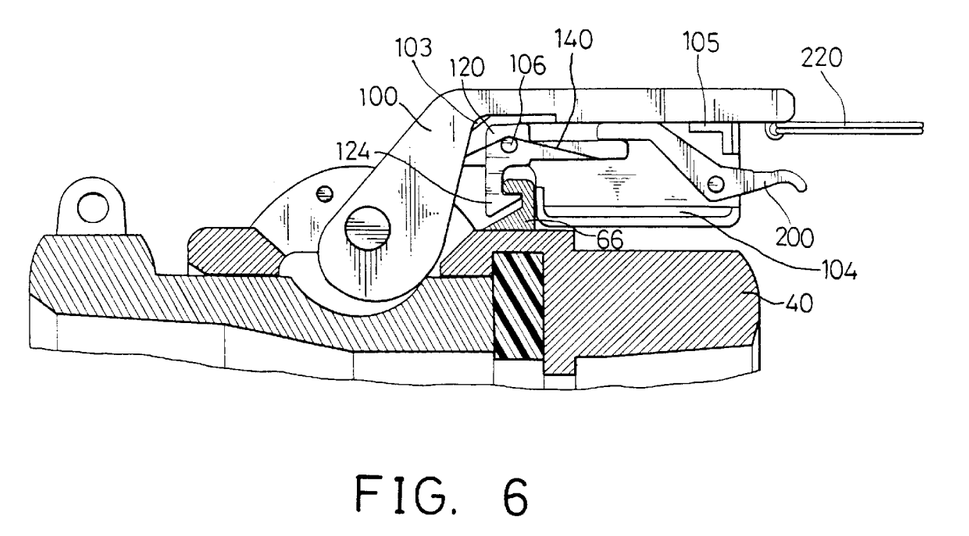
FIG. 6 is a side view similar to FIG. 4 but showing a second embodiment of the self-locking quick-disconnect coupling device according to this invention.

The rod 64 as shown in FIGS. 1–5 can be replaced by a tongue 66 projecting from the female coupler 40 as shown in FIG. 6.

Figure 7:
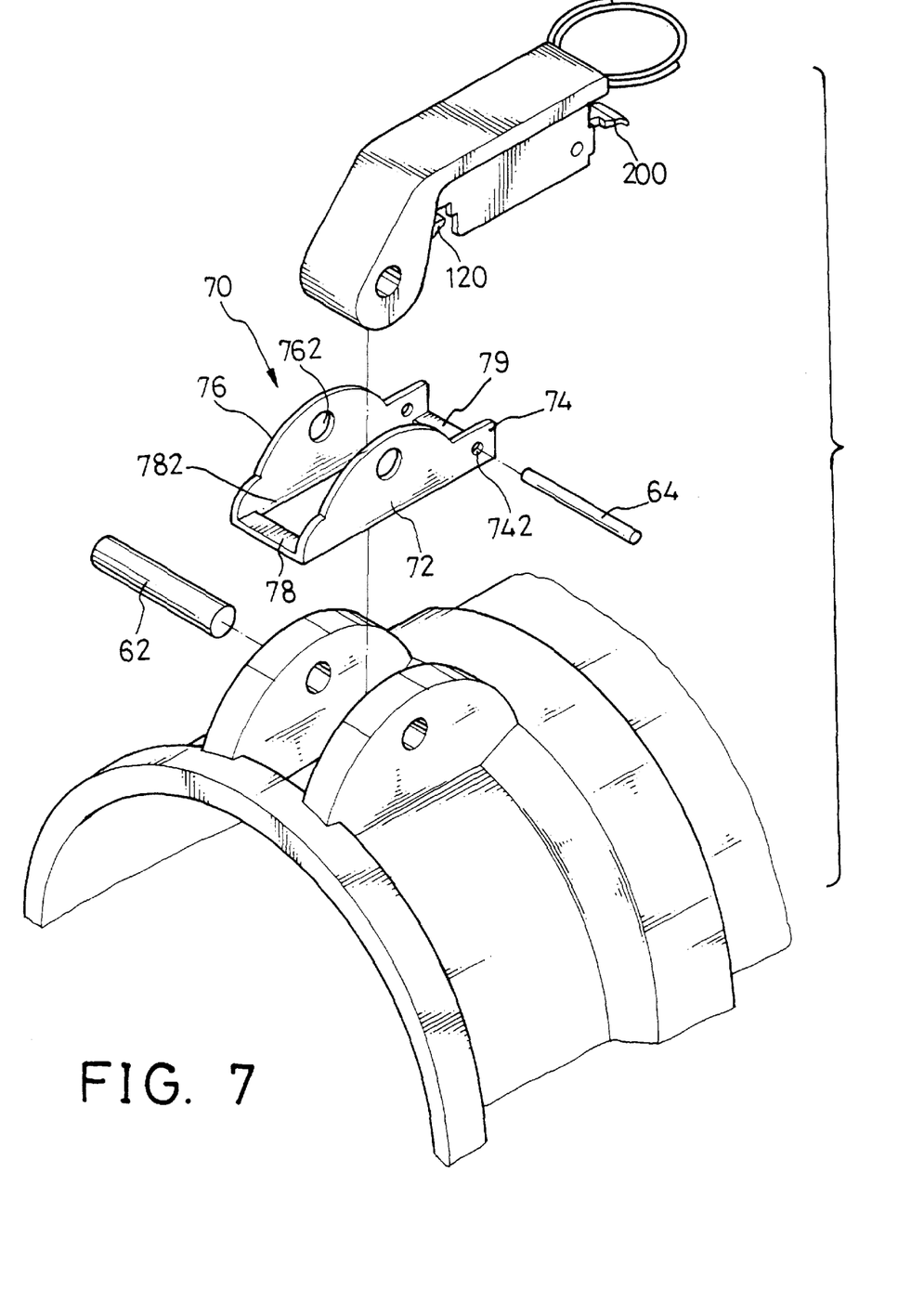
FIG. 7 is an exploded view showing a third embodiment of the self-locking quick-disconnect coupling device according to this invention.

FIG. 7 shows a third embodiment of the self-locking quick-disconnect coupling device. Except the following difference, the structure of the third embodiment is substantially the same as that of the first embodiment as shown by FIGS. 1–5. In the third embodiment, the fins are not integrally formed with the lugs, but defined in a mounting member 70 which is formed by pressing a metal plate. The mounting member 70 is formed to have two upright side walls 72 and a bottom wall 78 and 79 connecting therewith. The side walls 72 define a fin portion 74 defining first holes 742 and a lug portion 76 defining second holes 762. The bottom wall 78 and 79 define an opening 782. The mounting member 70 is mounted on the female coupler 40 by extending the pivot 62 through the lugs 42 on the female coupler 40, the lug portion 76 on the mounting member 70 and the cam portion 110 of the cam handle 100 wherein the pivot 62 is fixedly connected with the lug portion 76 and the lugs 42 and pivotably connected with the cam portion 110. Then, the rod 64 is fixedly mounted on the fin portion 74. The rod 64 is used to snappingly engage with the barb 124 of the hooking element 124. When the mounting member 70 is mounted on the female coupler 40, the opening 782 defined by the bottom wall 78 and 79 is aligned with the opening 44 of the female coupler 40 so that the cam portion 110 can move through the opening 44 into the recess 52.

I CLAIM:

1. A self-locking quick-disconnect coupling device comprising:

a female coupler (40) including a stop formed thereon and an opening (44) defined therethrough;

a male adaptor (50) being insertable into the female coupler (40) and including a recess (52) defined therein;

a cam handle (100) including a handle portion and a cam portion (110) rotatably mounted on the female coupler (40) between a releasing and an engaging position so that the cam portion (110) is moved through the opening (44) into the recess (52);

a hooking element (120) pivotably linked to the handle portion and including a first portion and a second portion wherein the first portion includes a barb (124) projecting therefrom and including an inclined surface (128);

a locking control element (200) pivotably linked to the handle portion and including a first distal end engageable with the second portion of the hooking element (120) and a second distal end;

a spring attached to the handle portion and engageable with the second portion of the hooking element (120), said spring exerting a spring force on the second portion of the hooking element (120) to cause the second portion and the first distal end of the locking control element (200) to move toward the handle portion;

wherein the inclined surface (128) will slide on the stop when the cam portion (110) is pivoted from the releasing position to the engaging position thus allowing the barb (124) to snappingly engage with the stop in the engaging position, said snapping engagement between the barb (124) and the stop being released when said locking control element (200) is pivoted by pushing the second distal end thereof toward the handle portion to cause the hooking element (120) to also have a pivotal movement.

2. A self-locking quick-disconnect coupling device according to claim 1 wherein the first and second portions of the hooking element (120) extend perpendicular to each other.

3. A self-locking quick-disconnect coupling device according to claim 1 including a first vertical plate (101) projecting from the handle portion and first, second horizontal rods (106, 108) projecting from the first vertical plate (101), wherein the hooking element (120) is pivotably mounted on the first horizontal rod (106), and the spring is a torque spring (140) mounted on the first or second horizontal rod (106, 108), and the locking control element (200) is pivotably mounted on the second horizontal rod (108).

4. A self-locking quick-disconnect coupling device according to claim 3 wherein the hooking element (120) includes a hole (122) defined therethrough, and the hooking element (120) is pivotably mounted on the first horizontal rod (106) by insertion of the first horizontal rod (106) into the hole (122).

5. A self-locking quick-disconnect coupling device according to claim 3 wherein the locking control element (200) includes a hole (202) defined therethrough, and the locking control element (200) is pivotably mounted on the second horizontal rod (108) by insertion of the horizontal rod (108) into the hole (202).

6. A self-locking quick-disconnect coupling device according to claim 3 including a second vertical plate (160) mounted on the first and second horizontal rods (106, 108).

7. A self-locking quick-disconnect coupling device according to claim 6 including a horizontal plate (102)

projecting from the first vertical plate (101) and including a shoulder portion (104) formed thereon and located against the second vertical plate (160) so that the handle portion, the vertical plates (101, 160) and the horizontal plate (102) make a housing for protecting the hooking element (120), the torque spring (140) and the locking control element (200).

8. A self-locking quick-disconnect coupling device according to claim 7 wherein the horizontal plate (102) includes shoulders (103, 104, 105) formed thereon, and the second vertical plate (160) is mounted on the horizontal plate (102) while the second vertical plate (160) includes first and second holes (162, 164) defined therethrough.

9. A self-locking quick-disconnect coupling device according to claim 1 wherein the female coupler (40) comprises a pair of lugs (42) projecting from an outer surface thereof and wherein the stop consists of a pair of fins (422) integrally formed with the lugs (42) and a rod (64) mounted on the fins (422).

10. A self-locking quick-disconnect coupling device according to claim 1 wherein the stop is a tongue (66) projecting from the female coupler (40).

11. A self-locking quick-disconnect coupling device according to claim 1 wherein the female coupler (40) comprises a pair of lugs (42) projecting from an outer surface thereof and the stop comprises a mounting member (70) defining a fin portion (74) and a rod (64) mounted on the fin portion (74), said mounting member (70) being fixedly mounted on the female coupler (40) by extending a pivot (62) through the mounting member (70) and the lugs (42) of the female coupler (40) wherein the cam portion (110) of the cam handle (100) is pivotably mounted on the pivot (62).

* * * * *